United States Patent
Chidambaran et al.

(10) Patent No.: US 9,697,253 B2
(45) Date of Patent: Jul. 4, 2017

(54) CONSISTENT CLIENT-SIDE CACHE

(75) Inventors: Lakshminarayanan Chidambaran, San Jose, CA (US); Mehul Dilip Bastawala, Sunnyvale, CA (US); Srinath Krishnaswamy, Fremont, CA (US); Tirthankar Lahiri, Palo Alto, CA (US); Juan R. Loaiza, Woodside, CA (US); Bipul Sinha, Foster City, CA (US); Srinivas S. Vemuri, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 927 days.

(21) Appl. No.: 11/875,782

(22) Filed: Oct. 19, 2007

(65) Prior Publication Data

US 2008/0098173 A1 Apr. 24, 2008

Related U.S. Application Data

(60) Provisional application No. 60/853,117, filed on Oct. 20, 2006.

(51) Int. Cl.
*G06F 17/30* (2006.01)

(52) U.S. Cl.
CPC .................. *G06F 17/3048* (2013.01)

(58) Field of Classification Search
CPC .................................................. G06F 17/3048
USPC .......................... 707/648–649, 654, 687, 689
See application file for complete search history.

(56) References Cited

U.S. PATENT DOCUMENTS

| | | | |
|---|---|---|---|
| 5,544,345 A | 8/1996 | Carpenter | |
| 5,864,854 A | 1/1999 | Boyle | |
| 5,963,959 A | 10/1999 | Sun et al. | |
| 6,026,413 A * | 2/2000 | Challenger | G06F 12/0815 |
| | | | 707/798 |
| 6,549,917 B1 | 4/2003 | Pollard et al. | |
| 6,728,747 B1 | 4/2004 | Jenkins et al. | |
| 6,823,514 B1 | 11/2004 | Degenaro | |
| 6,912,562 B1 | 6/2005 | Krisshnamurthy et al. | |
| 6,917,976 B1 * | 7/2005 | Slaughter | G06F 9/465 |
| | | | 707/999.009 |
| 6,950,823 B2 * | 9/2005 | Amiri et al. | 707/690 |
| 6,957,236 B1 | 10/2005 | Ganesh et al. | |

(Continued)

OTHER PUBLICATIONS

Non-Final Office Action for U.S. Appl. No. 11/876,679 mailed Nov. 16, 2009.

(Continued)

*Primary Examiner* — Huawen A Peng
(74) *Attorney, Agent, or Firm* — Vista IP Law Group, LLP

(57) ABSTRACT

A method, system, and computer program product is disclosed for caching results in a client-side cache. Embodiments of a method, a system, and a computer program product are disclosed that associate a first snapshot of a database with a client that indicates a state of the database after a last database request by the client, and indicate any number of invalid cached results in the client cache for the client based upon the first snapshot. In some embodiments, the method further includes receiving a second snapshot that indicates a state of the database upon receipt of a database server request by the client, and updating the first snapshot with the second snapshot.

34 Claims, 9 Drawing Sheets

(56) References Cited

U.S. PATENT DOCUMENTS

| | | | |
|---|---|---|---|
| 6,976,022 B2 | 12/2005 | Vemuri et al. | |
| 6,981,004 B2 | 12/2005 | Ganesh et al. | |
| 7,181,476 B2 | 2/2007 | Lee et al. | |
| 7,240,091 B1* | 7/2007 | Hopmann et al. | 709/203 |
| 7,376,682 B2 | 5/2008 | Ramacher et al. | |
| 7,523,342 B1 | 4/2009 | Fu et al. | |
| 7,526,508 B2 | 4/2009 | Tan et al. | |
| 2001/0034736 A1 | 10/2001 | Eylon et al. | |
| 2002/0064149 A1 | 5/2002 | Elliott et al. | |
| 2002/0087798 A1 | 7/2002 | Perincherry et al. | |
| 2002/0107835 A1 | 8/2002 | Coram et al. | |
| 2002/0116457 A1 | 8/2002 | Eshleman | |
| 2003/0004952 A1* | 1/2003 | Nixon et al. | 707/10 |
| 2003/0009431 A1 | 1/2003 | Souder et al. | |
| 2003/0046286 A1* | 3/2003 | Jacobs et al. | 707/8 |
| 2003/0204517 A1* | 10/2003 | Skinner et al. | 707/100 |
| 2003/0217081 A1* | 11/2003 | White | G06F 12/0813 |
| 2004/0015504 A1 | 1/2004 | Ahad et al. | |
| 2004/0054643 A1 | 3/2004 | Vemuri et al. | |
| 2004/0054644 A1 | 3/2004 | Ganesh et al. | |
| 2004/0085980 A1 | 5/2004 | Lee | |
| 2004/0220961 A1 | 11/2004 | Lee et al. | |
| 2004/0267824 A1 | 12/2004 | Pizzo et al. | |
| 2005/0055381 A1 | 3/2005 | Ganesh et al. | |
| 2005/0055384 A1 | 3/2005 | Ganesh et al. | |
| 2005/0055672 A1 | 3/2005 | Ramacher et al. | |
| 2005/0055673 A1 | 3/2005 | Dias et al. | |
| 2005/0086195 A1 | 4/2005 | Tan et al. | |
| 2005/0108203 A1 | 5/2005 | Tang et al. | |
| 2005/0240943 A1 | 10/2005 | Smith et al. | |
| 2005/0246716 A1 | 11/2005 | Smith et al. | |
| 2006/0036676 A1 | 2/2006 | Cardone et al. | |
| 2006/0136508 A1 | 6/2006 | Idicula et al. | |
| 2006/0271510 A1* | 11/2006 | Harward et al. | 707/2 |
| 2006/0271511 A1* | 11/2006 | Harward et al. | 707/2 |
| 2006/0271557 A1* | 11/2006 | Harward et al. | 707/10 |
| 2007/0143344 A1* | 6/2007 | Luniewski | G06F 17/30696 |
| 2007/0244918 A1 | 10/2007 | Lee et al. | |
| 2008/0095339 A1 | 4/2008 | Elliott et al. | |
| 2008/0098173 A1 | 4/2008 | Chidambaran et al. | |
| 2008/0235291 A1 | 9/2008 | Lahiri et al. | |
| 2009/0109959 A1 | 4/2009 | Elliott et al. | |

OTHER PUBLICATIONS

Final Office Action for U.S. Appl. No. 11/876,679 mailed May 26, 2010.

Snapshot Concepts & Architecture, Oracle8i Replication, Release 2 (8.1.6), A76959-01, Oracle Corporation 1999, 29 pages.

Fielding et al., "9 Method Definitions" Hypertext Transfer Protocol, HTTP/1.1 RFC 2616, Copyright (C) The Internet Society (1999), 5 pages.

Advisory Action for U.S. Appl. No. 11/876,679 dated Oct. 16, 2012.

Final Office Action for U.S. Appl. No. 11/876,679 dated Aug. 6, 2012.

Non-Final Office Action for U.S. Appl. No. 11/876,679 mailed Feb. 27, 2012.

Non-final Office Action dated Jan. 30, 2015 for U.S. Appl. No. 11/876,679.

Final Office Action dated Aug. 25, 2015, for related U.S. Appl. No. 11/876,679.

* cited by examiner

CONSISTENT CLIENT-SIDE CACHE

CROSS-REFERENCE TO RELATED APPLICATIONS

The present application claims the benefit of U.S. Provisional Application No. 60/853,117, filed on Oct. 20, 2006.

FIELD

Embodiments of the invention relate to computer systems, and more particularly to a client-side cache.

BACKGROUND OF THE INVENTION

A cache is a collection of data that is a duplication of original values stored elsewhere or computed earlier, when the original data is expensive to fetch or to compute relative to retrieval from the cache. For example, a server-side query cache for a database may store the results for a Structured Query Language (SQL) query received by the server in a cache in server memory. Storage of the query results in the server-side query cache enables the retrieval of the results for a query upon receipt of an identical query without requiring the server to re-execute the query against the database. In order to receive accurate results from the query cache, there must not have been a change in the data that was relied upon in the formation of the initial result for the query. A server side query cache may improve the retrieval results of the data, primarily with read only or read mostly data.

In one embodiment, the cache is implemented as a daemon process, a process running in the background, running on the client that the client interacts with for caching. In another embodiment, a caching daemon process may run on a middle tier and be shared between multiple clients. The cache can be located per client session, per client process shared by different sessions in same process, in shared memory/daemon-process on client shared by different client processes on the same machine, or in a daemon on a different machine shared by different client machines. A client-side query cache can either be in memory and/or on physical storage accessible by client processes.

Client-side query caches, a query cache in client memory, provide additional benefits over a server-side cache. First, caching on the client eliminates the necessity to perform the request to the server and receive the response from the server in order to retrieve the query results thereby improving response time. Client machines can keep being added horizontally to provide the caching capabilities in client memory and reducing the expense of setting up additional servers to support caching query result. Further, storage on the client side offers the benefit of not only having the queries closer to the client but also ensures that the most relevant queries to the client are stored at the client.

However, storage of the query results in a client-side query cache may introduce data consistency problems that are not present with the use of a server-side query cache, and the data correctness problems, if left unresolved, produce unexpected results for the user querying the database. In the database, a snapshot, a record of the state of the database, is created when a transaction is executed that changes the state of the database. The snapshot is monotonically increasing and there is never a regression back to an earlier snapshot, which means that succeeding queries in time see more recent snapshots and never earlier snapshots. Any statement executed on the database is guaranteed to run against such a consistent snapshot, also known as the execution snapshot, that guarantees to include all changes to the state of the database done by all transactions leading up to the snapshot, and no changes to the database after the snapshot will affect the results of the query run against that snapshot. The database guarantees the results of the query are generated against the snapshot of the database at the time of receipt of a query (also known as the query execution snapshot), and the user expects query results from a cache to maintain this level of transactional consistency. At the server, the server-side query cache can simultaneously invalidate query results in the cache upon receipt of a transaction that necessitates invalidating the corresponding query results stored in the cache. The client-side query cache residing on the client is not able to simultaneously invalidate the cache with changes that occur in the database, hence the challenge lies in the ability to produce consistent query results with the use of a client-side cache.

FIGS. 1A-B are block diagrams that illustrate the consistency problems encountered in the described approach with client-side query caches. In FIG. 1A, SQL queries have been previously requested by the Client 100 with the Database Application Programming Interface (API) 102 and the Client-side cache 104 has stored query results, as depicted with Query Results for Table A 106 and Query Results for Table B 108. The Query Results for Table A 106 and Query Results for Table B 108 in the Client-side Cache 104 reflect the contents of the tables, Table A 110 and Table B 112 respectively, currently in the Database 114 on the Database Server 116. There is a relationship between Table A 110 and Table B 112 (e.g. trigger) that requires that a portion of the data in Table A 110 be placed in Table B 112. With the Database API 102, in the same transaction that modifies Table A 110, Client 100 makes a Request to Insert Mehul in to Table A 118.

FIG. 1B shows the contents of the Client-side Cache 104 of the Client 100 and the Database 114 after the Database Server 116 responded to the Request to Insert Mehul To Table A 118. The Database Server 116 has responded to the Request to Insert Mehul 118 to Table A 118 by inserting a second row to Table A 110 (e.g. "2 Mehul mehulB") and the insertion of the row to Table A 110 has triggered the addition of a second row to Table B 112 (e.g. "2 Mehul"). The Client-side Cache 104 is aware of the request made by the Client 100 as reflected by the contents of the Query Results for Table A 106 and unaware of the addition to Table B 112 as reflected by the Query Results for Table B 108. Thus, in FIG. 1B, if the Client 100 in FIG. 1B requests the contents of Table B 112, then the Client 100 will lookup the results in the Client-Side Cache 104 and retrieve the Query Results for Table B 108 without the newly added row. The production of query results for Table B with the client-side cache without the newly added row cannot be properly handled by the application relying on the data.

Thus, there is a need for a solution to ensure the same level of consistency with client-side cache as the user expects with the database or the use of a server-side cache. The solution should be both a transparent solution and guarantee transactional correctness similar to that provided by the database with the use of a snapshot. As another example, query results could be a join of multiple tables and there is a need to refresh cached result(s) with database changes that affect any of the tables in the query. Additionally, there could be different clients or software running on the server that concurrently make database changes that affect the cached result set and there is a need to identify all database changes that affect cached result sets on the client. Beyond database changes, user environment settings (e.g.

changing the language from French to German) may affect the result set and there is a need to detect such non-database changes to refrain from returning incorrect results to the application. A change in session or environment settings may indicate a need to invalidate cached result sets or create new cached result sets.

Although embodiments are described in reference to a client-side query cache, it should be noted that the consistent caching implementation can also be used with caches that support other content. For example, the consistency of the client-side cache can be used to ensure consistent caching of any other type of cached content that may be derived from the result from of a database operation.

SUMMARY OF THE INVENTION

A method, system, and computer program product for caching results in a client-side cache is described. In some embodiments, the caching is performed by associating a first snapshot of a database with a client, wherein the first snapshot indicates a state of the database after a last database request by the client, and indicating any number of cached results as being invalid in the client-side cache for the client based upon the first snapshot.

A computer program product with a computer usable medium having executable code to execute a process for implementing a client cache in a computing system is described. In some embodiments, a client cache process is performed by associating a first snapshot of a database with a client, wherein the first snapshot indicates a state of the database after an interaction with the database by the client, and invalidating any number of invalid cached results in the client cache for the client based upon the first snapshot.

BRIEF DESCRIPTION OF THE DRAWINGS

The invention is illustrated by way of example and not limitation in the figures of the accompanying drawings, in which like references indicate similar elements and in which.

DETAILED DESCRIPTION

Embodiments of the present invention provide methods, systems and mediums for implementing a consistent client-side cache.

Figure 1A:
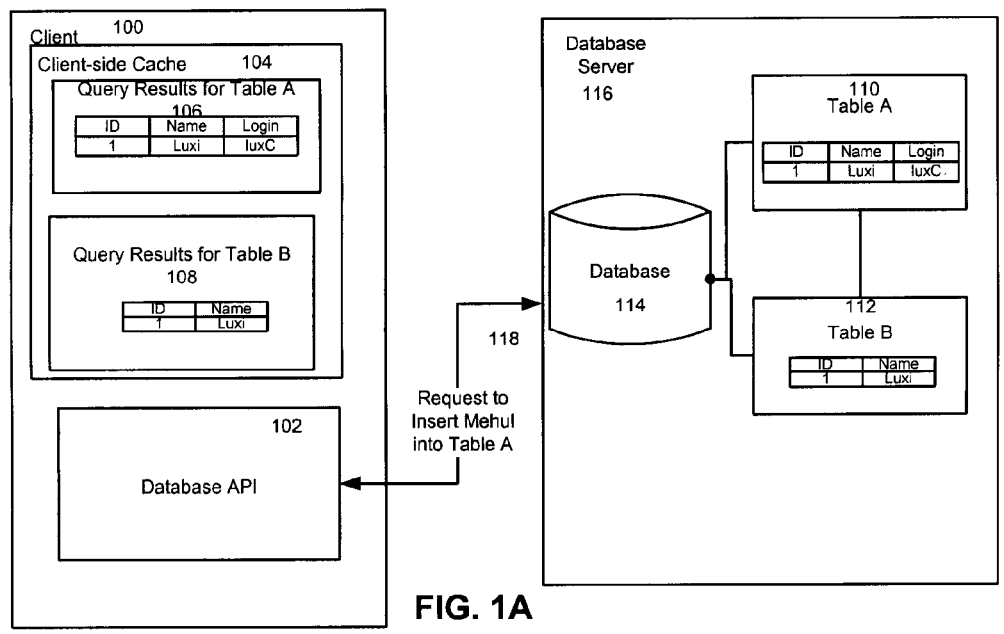
FIGS. 1A-B show block diagrams of the prior art.
Figure 1B:
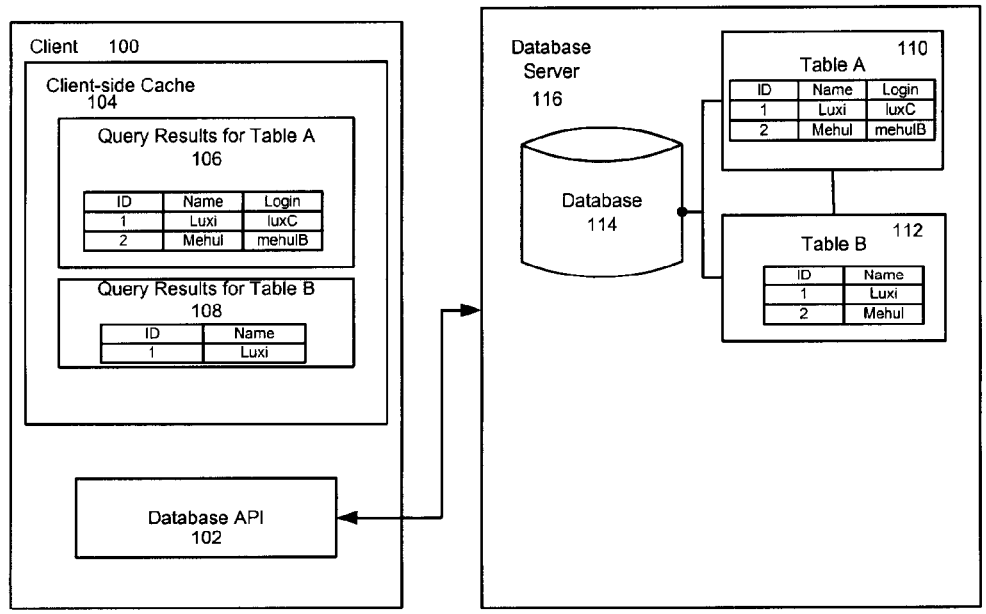
Figure 2A:
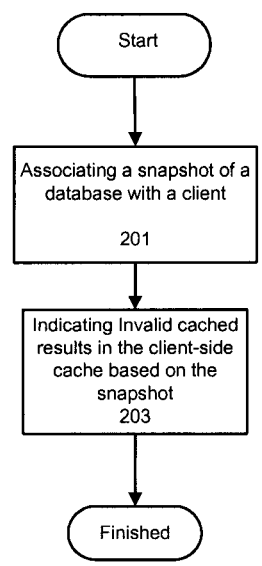
FIG. 2A is a flowchart of a process for implementing a consistent client-side cache.

FIG. 2A is a flowchart for a process for implementing a client-side cache. In FIG. 2A, a snapshot of a database is associated with a Client (201) that is supported by a client-side cache. In one or more embodiments, the snapshot may be stored at a cache manager for the client-side cache, on a database server, in client memory, or in any storage that is accessible by a module that invalidates cached results provided that there are cached results to invalidate. Based upon the association of the client with the snapshot, the invalid cached results in the client-side cache may be indicated based upon the snapshot (203). Embodiments of the client-side cache may compare the snapshot associated with the client with the current snapshot of the database to determine the cached results that can be invalidated. In one or more embodiments, a database server or database may store all transactions that occur on the database and reference the stored transactions to determine the changes to the database over time after the snapshot.

Figure 2B:
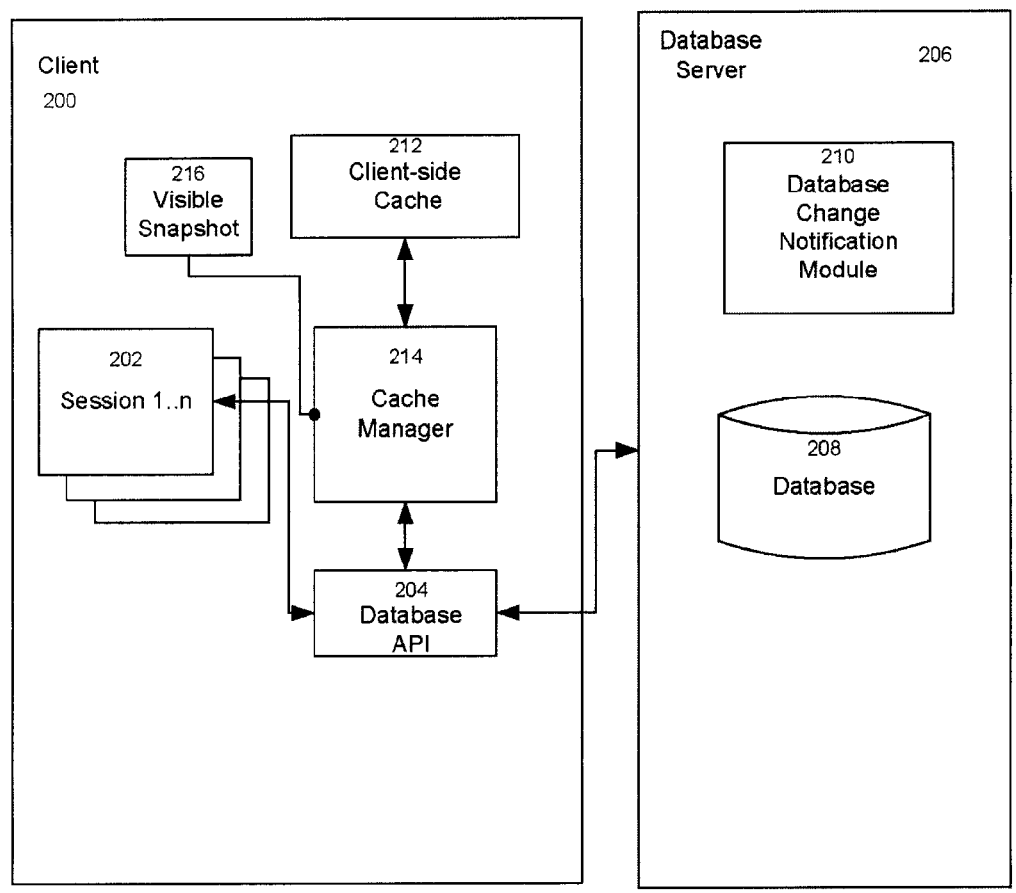
FIG. 2B depicts an architecture for implementing consistent query caches.

FIG. 2B shows an example of a client server architecture for implementing a consistent client-side query cache. In FIG. 2B, Client 200 may support any number of Sessions 1 . . . N 202 that use the Database API 204 to make requests to the Database Server 206. Sessions 1 . . . N 202 are lasting connections with a server. The Database Server 206 may access or consist of the Database 208, a collection of data, to fulfill SQL query requests or DML commands from the Client 200. In one or more embodiments, the Database Server 206 could access or consist of a cluster of databases and within the cluster broadcast received transactions to the other database instances within the cluster. In response to SQL query requests, the Database Server 206 will return the result set generated upon execution of the SQL query by the Database 208 and may determine that the query is cacheworthy, a good candidate for caching.

In general for some embodiments, a cacheworthy query is a query that will be repeated and the data returned as a result of the query runs less of a risk of becoming stale (e.g. a query that requests the current date and time value is not cacheworthy because the date and time will be stale upon retrieval from the cache). Other considerations in determining the cacheworthiness of the query may include: the size of query results (e.g. results may not fit in the client cache), whether the query results rely on data from read only or read mostly tables, and the frequency expectation for a repeat of the query request. Alternatively, considerations for designating a query or a table on which queries are not to be cached may include: if the table is expected to change often, if the query is very inexpensive to compute, if the query is not repeated often or if the result set for the query is very large. Those skilled in the art will recognize that there are many factors or considerations that may contribute to whether a query or a query on a particular table should not be cached.

Queries and queries on a particular table that are cacheworthy or should not be cached can be determined both in design of the database and at runtime of the consistent client-side cache. In one or more embodiments of the present invention, a database query optimizer can be used to transparently detect cacheworthy query candidates and make a client aware that a query is a good candidate for caching. Embodiments may use manual hints in Data Description Language (DDL) commands that define tables or views to indicate queries that are cacheworthy or not cacheworthy. A hint may also be provided in the SQL text of a query. For example, a hint may be provided for a table T to indicate that queries on table T are cacheworthy when table T is a read only or read mostly table. A hint that designates a query or queries on a particular table does not necessarily imply that the query will be cached in all cases. Embodiments may also indicate programmatically with the use of the database API that a query is cacheworthy. Those skilled in the art will recognize that there are many factors that contribute to whether a query will be cached such as the actual size of the result set and the amount of memory available in the cache. In one or more embodiments, tables or queries can be designated as not to be cached with the use of DDL commands, SQL queries or programmatically.

Continuing with FIG. 2B, if the query is not cacheworthy, then the query results are returned to the Database API 204 without registration with the Database Change Notification Module 210. Alternatively, if the query is cacheworthy, then the Database Server 206 will register the query with the Database Change Notification Module 210. Examples of approaches for a Database Change Notification Module are described in co-pending U.S. application Ser. No. 10/866,344, filed on Jun. 10, 2004, entitled "Query-Based Invalidation Subscription", which is hereby incorporated by reference in its entirety and co-pending U.S. application Ser. No. 10/866,433, filed on Jun. 10, 2004, entitled "Active Queries Filter Extraction", which is hereby incorporated by reference in its entirety.

The Database Change Notification Module 210 provides notification of changes in the underlying data relied upon to generate the query results for registered queries that would cause the query results stored in the Client-side Cache 212 to be invalid. The Database Change Notification Module 210 generates a set of cache invalidations for registered queries that are pertinent to the Client 200 and/or the Session 202 used for the current server roundtrip (i.e. make requests and receive responses from a database server), and the cache invalidations will be returned whenever the Client 200 sends any message to the Database Server 206. In one or more embodiments, the invalidations are put in the shared memory of the instance allowing access to all processes running on the instance to the invalidations and to other shared memory instances before the transaction commits.

In some embodiments, a cached result identifier in the set of cache invalidations is the combination of a query id and a transaction id. To differentiate result sets, each result set may be assigned a unique identifier by the Database Server 206, referred to as a cached result identifier or a query Id. Multiple cached result sets in a Client-side Cache 212 may be associated with the same query Id. In one or more embodiments, a query Id may be combined with a sequence number that is incremented for every Client-side Cache 212. In one or more embodiments, the last query Id may be stored persistently so that the sequence number is available after a Database Server 206 restart. Optionally, depending on the granularity of the Database Change Notification Module 210 described below, the query Ids can be shared across SQL-text, across bind values and across Client-side Caches 212. In one or more embodiments, the query Id can be shared across Client-side Caches 212 to efficiently utilize database resources and allow cleanup of the Query Ids stored at the Database to be based on a reference count of the number of Client-side Caches 212 receiving change notification for the SQL queries with the same Query Id.

Continuing with FIG. 2B, the Database Server 206 will also return an Out Snapshot, a snapshot of the database after receipt of a database request from the Client 200, with the query results, and the cache invalidations to the Database API 204 up to the Out Snapshot may be included in the returned message.

The Cache Manager 214 invalidates the identified cached result sets corresponding to the query ids included in the cache invalidations for the Client 200 and the Session 202. In some embodiments, a query id corresponds to an identifier for the query assigned by the Database 208. Upon receipt of the cache invalidations, and the Out Snapshot from the Database Server 206, the Database API 204 sets the Visible Snapshot 216, a record of the state of the database at the time of the last database request (e.g. query, DML request) for the Client 200, associated with the Client 200 to the Out Snapshot, and passes the cache invalidations to the Cache Manager 214. The Database API 204 passes the returned query results to the Client 200. The Database API 204 passes the query results to the Cache Manager 214 provided that the query results are cacheworthy and the Cache Manager 214 caches the query results in the Client-side Cache 212. If the query is cacheworthy, then the query results will contain the keys (e.g. a compile time key and a run time key described in more detail below) for entry into the cache, and retrieval of the query results from the cache.

In one or more embodiments, a query may be deemed cacheworthy by the Database Server 206 but may not be cached by the Client 200 due to additional constraints on caching for the particular Client 200 (e.g. resource constraints limiting the size of result sets). The constraints (e.g. maximum cached result set size) may be specified at the Database Server 206 and communicated to Client-side Cache 212. These constraints may also be specified at client. To prevent the Database Server 206 from continuing to send invalidations for the query ids related to the uncached results, the Client 200 may indicate to the Database Server 206 on a subsequent request a list of query ids that are not to be cached on the Client 200.

A database query optimizer may find that the query is no longer cacheworthy. For example, the database query optimizer may determine that the result set is changing too often and requiring too frequent updates to the results. In such cases, the client-side cached result set will be invalidated and may not be subsequently cached.

At a later point in time, the Database API 204 may call the Cache Manager 214 to lookup the query results in the Client-side Cache 212 upon receipt of a query request, and will return the query results from the Client-side Cache 212. The Cache Manager 214 will incorporate user environment settings such as the character set encoding and language into the lookup so the application receives the correct result sets in the same way that the client would receive the result sets without the client cache enabled. Although FIG. 2B illustrates a client server architecture, those skilled in the art will recognize that embodiments are not limited to a client server model. In one or more embodiments, a client-side cache may be implemented on an n-tier architecture or with use of any remote networked node that caches data.

In one or more embodiments, the Client 200 may not be making periodic requests to the Database Server 206 such that it is possible for lookups to the Client-side Cache 212 to return consistent data with respect to the Client 200 Visible Snapshot 216, but the results may be stale in comparison to the changes on the Database 208. For this embodiment, the Client 200 Visible Snapshot 216 may lag behind the Database 208 current snapshot to an extent that is unacceptable to the Client 200 application. One approach to handling a possible lag on the Client 200 is to set a maximum Client-side cache 212 lag parameter on the Database Server 206 that may be communicated to the Client-side cache 212, and/or set a cache lag parameter on the Client 200 itself. A Database Server 206 response received by a Client 200 may update a Cache-Server interaction time. If the difference between a current time and the Cache-Server interaction time is greater than a maximum client-side cache lag parameter, then the Cache Manager 214 may not perform a lookup of the Client-side Cache 212 and may instead force the query to be executed against the Database Server 206. The response from the Database Server 206 will update the Cache-Server interaction time.

Figure 3:
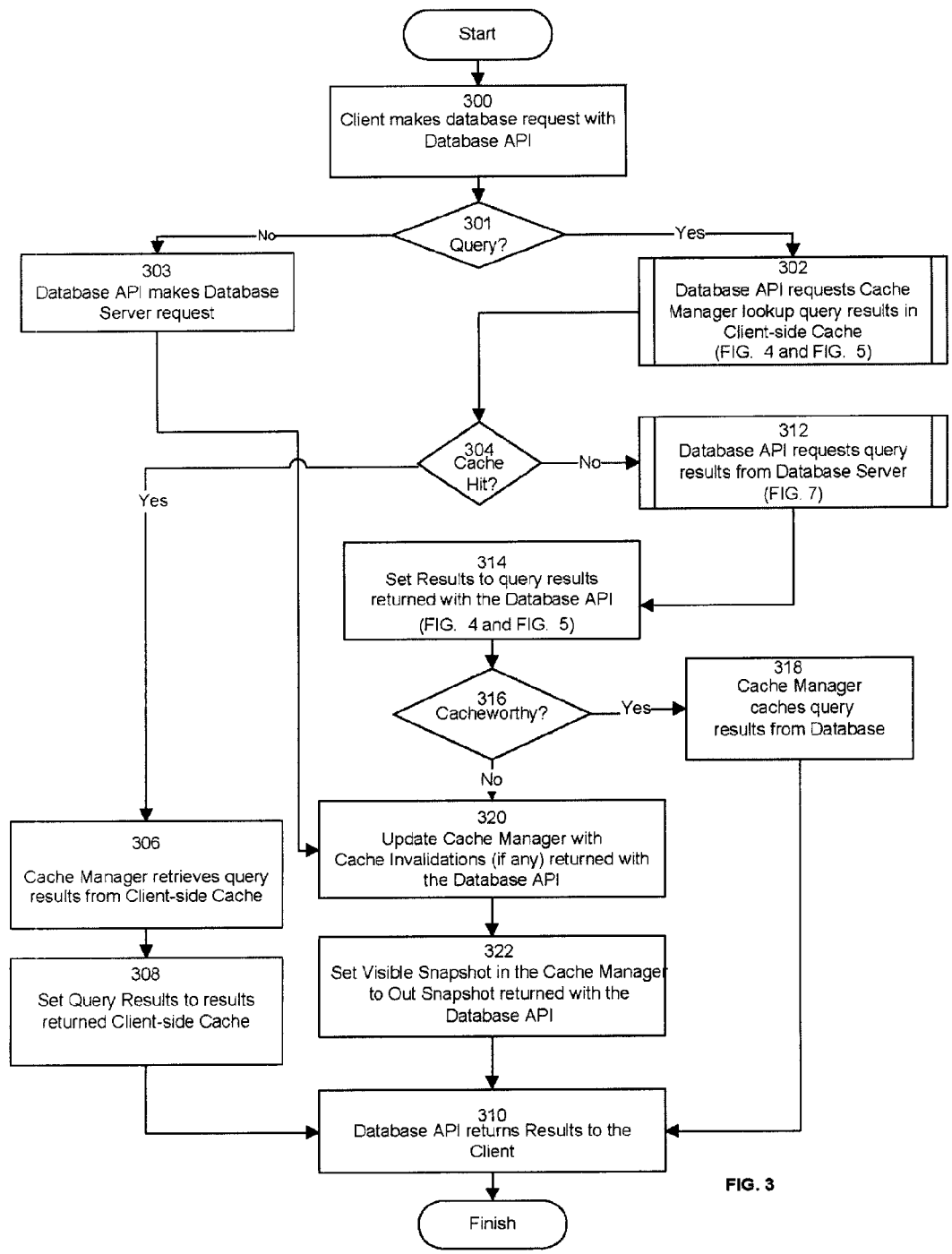
FIG. 3 is a flowchart of a process for implementing a consistent client-side cache.

FIG. 3 is a flowchart for a process for implementing a consistent client-side cache. FIG. 3 describes the implementation in regards to a database request that may be implemented with the use of any type of request made to the database. The caching implementation may be applied for use with any database request originating from client cache process server, including but not limited to database calls related to large objects (LOBS), complex objects, XML calls, and checking the server status. Initially, a Client 200 makes a database request with the Database API 204 (300). Next, if the Client 200 request does not involve a database query (301), then the Database API 204 makes a Database Server 206 request (303). Next, the cache is updated with the Cache Invalidations (if any) returned by the Database Server 206 (320). To update the cache, the cached queries included in the set of Invalid Query Ids are removed from the cache. In one or more embodiments, the Database API 204 will return with correct query results for the Invalid Query Ids. The identified set of Dirty Query Ids are used to indicate that the session should not use the cached copy of the data due to the uncommitted changes made to the database tables by the session. Next, the Database Server 206 returns the results to the Client 200 (310).

Figure 4:
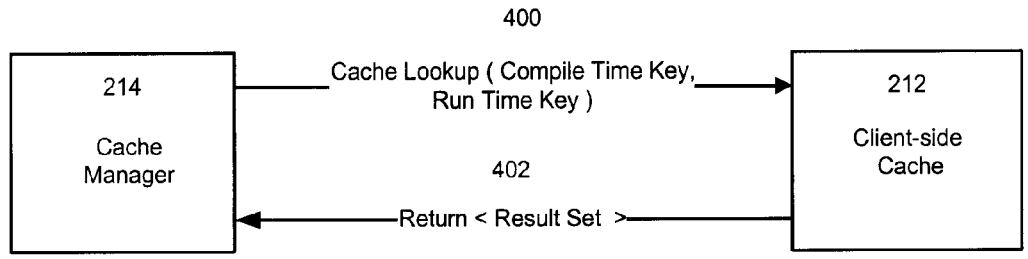
FIG. 4 is a block diagram for an implementation of a consistent client-side cache.
Figure 5:
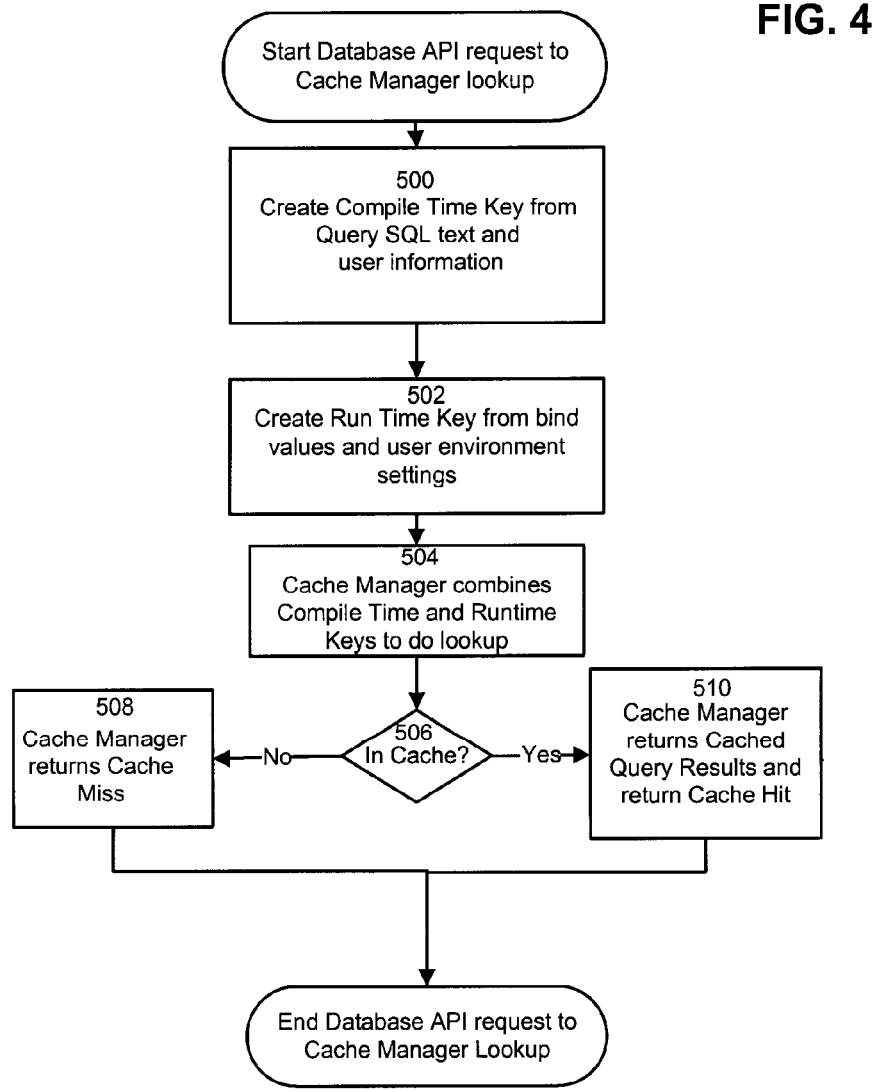
FIG. 5 is a flowchart of a process for implementing a consistent client-side cache.

Alternatively, if the database request is a database query (301), then the Database API 204 requests that the Cache Manager 214 lookup the query results in the Client-side Cache 212 (302) which is shown in FIGS. 4 and 5.

FIG. 4 is a block diagram for an interaction between a Cache Manager and a Client-side Cache. To perform the cache lookup (400), the Cache Manager 214 passes parameters that are combined to form a key to lookup the query in the Client-side Cache 212. In an embodiment of the invention, a compile time key, created with the SQL text and user information that does not change when executing a query repeatedly (e.g. preferred language, user identification), is combined with a run time key, formed with the SQL query bind values that may change between queries (e.g. Select*from Table A where name=[bind value];), to lookup the query results in the cache. The runtime key may also include user environment settings such as character set encoding to receive character values, language settings, and time zone. If the cache lookup results in a cache hit (402), then the Cache Lookup (400) returns the result set.

FIG. 5 is a flowchart for a process for a Database API request to the Cache Manager to lookup the query results. Initially, the compile time key is created from the SQL query text and the user information (500). Embodiments of the compile time key may be created at the client during query execution or the server may create the compile time key and send it to the client during query execution. A run time key formed from the bind values and environment settings may be created (502) and the Cache Manager 214 combines the compile time key and run time key to do the lookup (504) in the client-side cache 212. At 506, the Cache Manager determines if the query results are in the cache. If the query results are not in the cache, then the Cache Manager 214 returns a Cache Miss (508). The first lookup for a particular query will result in a cache miss. Alternatively, if the Cache Manager 214 retrieves the query results, then the Cache Manager 214 returns the cached query results and returns a cache hit (510).

Continuing with FIG. 3, if there is a cache hit (304), then the query results are in the Client-side Cache 212, following the Cache Manager 214 lookup (302), then the Cache Manager 214 retrieves the query results from the Client-side Cache 212 (306) and sets the Query Results to the results returned from the Client-side Cache 212 (308). The Database API 204 returns the results to the Client 200 (310).

Alternatively, in FIG. 3, if there is no cache hit (i.e. a cache miss) at (304), then the Database API 204 requests query results from the Database Server 206 (312) described in more detail below in FIGS. 6 and 7. At (314), the Query Results are set to the results returned from the Database Server 206 and a determination is made as to whether the query is cacheworthy (316) as described above with FIG. 2. If the query is cacheworthy, then the Cache Manager 214 caches the Query Results (318) and the Cache Manager 214 is updated with the Cache Invalidations (if any) returned from the Database Server 206 (320). In one or more embodiments, the Cache Manager 214 caches the query id, result set, and bind values for the cacheworthy query. Additionally, embodiments of the invention may cache the Out Snapshot of the query associated with the cached results. Alternatively, if the query is not cacheworthy (316), then the cache is updated with the Cache Invalidations (if any) returned by the Database Server 206 (320). To update the cache, the cached queries associated with the set of Invalid Query Ids are removed from the cache. In one or more embodiments, the Database API 204 will return with correct query results for the Invalid Query Ids. The identified set of Dirty Query Ids and their associated cached results are used to indicate that the session should not use the cached copy of the data due to the uncommitted changes made to the database tables by the session. Next, the Database Server 206 returns the results to the Client 200 (310).

Figure 6:
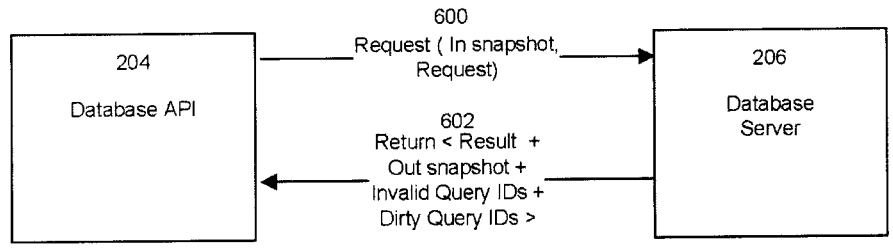
FIG. 6 is a block diagram for an implementation of a consistent client-side cache.

FIG. 6 is a block diagram for an interaction between a Database API request for results from a Database Server. The Client 200 will access the Database 208 with any Database API 204 used by those skilled in the art (e.g. Oracle Call Interface (OCI), Java Database Connectivity (JDBC)). In an embodiment, the Database API 204 used to implement the consistent client-side query cache is an extension of a remote procedure call within a database API. Database API 204 makes any request 600 by passing parameters of an In Snapshot and the request. In an embodiment, the In Snapshot parameter is set to the client's Visible Snapshot 216, a snapshot indicating the last interaction with the database, and the Query parameter is set to the client's desired SQL query. The Database Server 206 responds by returning the result for the request from executing the database request against the database, the Out Snapshot, and the Cache Invalidations, including the Invalid Query IDs, and the Dirty Query IDs (602). The Out Snapshot is a latest snapshot of the database. The Cache Invalidation is described in more detail in the description of FIG. 7.

Figure 7:
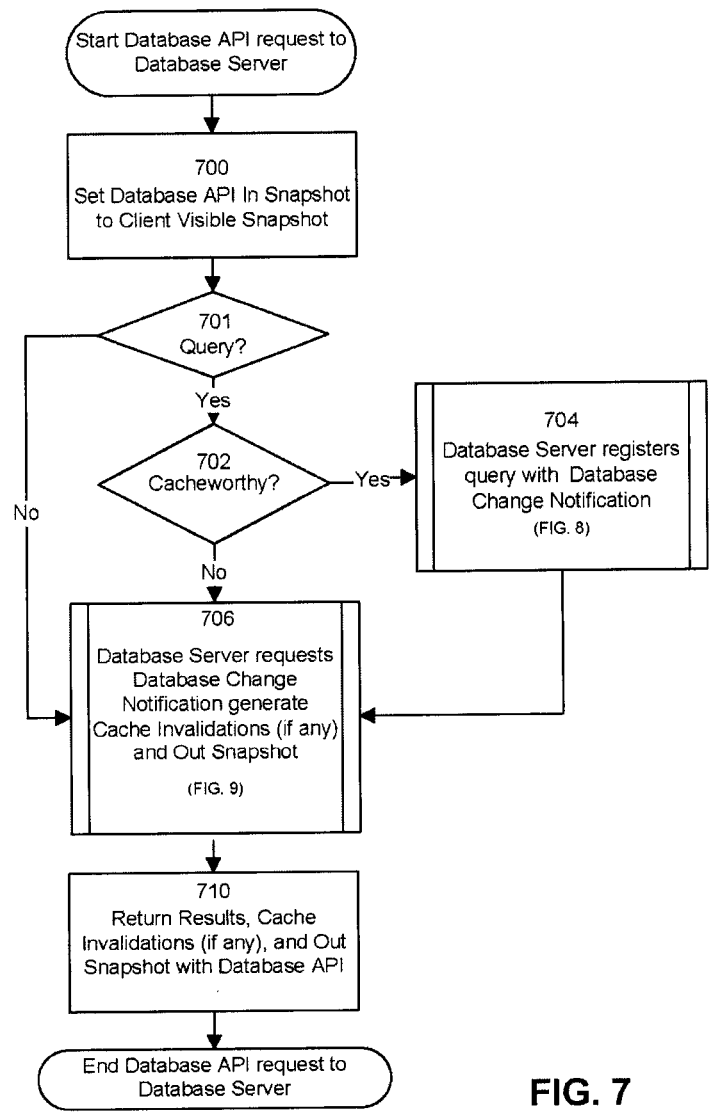
FIG. 7 is a flowchart of a process for an implementation of a consistent client-side cache.

FIG. 7 is a flowchart of the process of a Database API request to a Database Server. Initially, the Database API 204 parameter In Snapshot is set to the Client 200 Visible Snapshot 216 (700) to ensure that the Database Server 206 is aware of the state of the Database 208 at the last interaction that the Client 200 had with the Database 208. Next, the Database Server 206 determines whether the database request involves a database query (701). If the database request is not a query (701), then the Database Server 206 requests Database Change Notification generate Cache Invalidations and Out Snapshot as described in more detail with FIG. 9. If the database request is a query, then the Database Server 206 determines whether the query is cacheworthy (702) as described above in regards to FIG. 2. If the Database Server 206 determines that the query is not cacheworthy (702), then the Database Server 206 requests that the Database Change Notification Module 210 only generate the Cache Invalidations (if any) and Out Snapshot (706) described in more detail with the description of FIG. 9. Alternatively, if the Database Server 206 determines that the query is cacheworthy (702), then the Database Server 206 registers the query with the Database Change Notification Module 210 (704) described in more detail with the description of FIG. 8.

Figure 8:
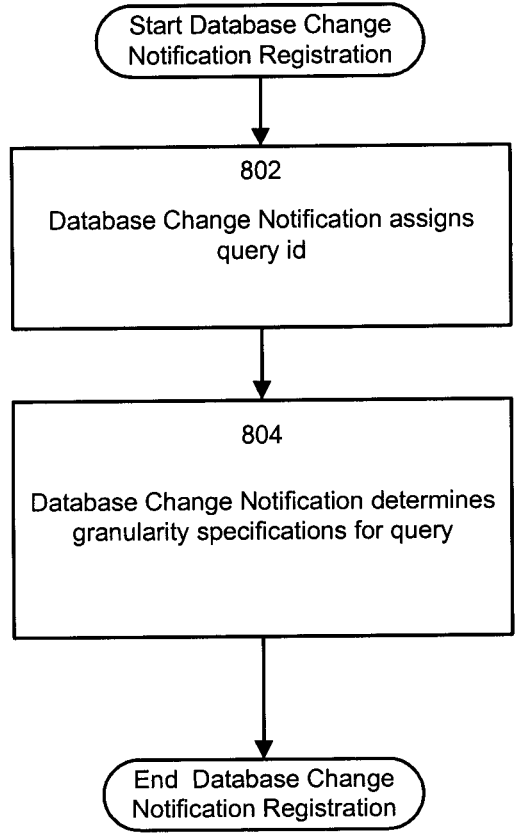
FIG. 8 is a flowchart of a process for an implementation of a consistent client-side cache.

FIG. 8 is a flowchart of a process for Database Change Notification Module Registration. By registering the query with the Database Change Notification Module 210, the Client 200 is able to receive notification of any changes that occur that would affect the query results stored in the Client-side Cache 212. Registration begins by assigning the value of the query id in the Database Change Notification Module (802). In one or more embodiments, the query id allows for identification of both the query and the client that requested the query. In one or more embodiments, a database clustering approach may be implemented and the Database Change Notification Modules registration information must be broadcast to the database instances within the cluster.

Registration may include determining the granularity specification for invalidation of the client-side query cache contents (804). For example, the client can specify that the invalidations of the query results be done when there is a change to any table referred to in query (i.e. coarse granularity) or the invalidation could be done to the query results only if there is a change in the result set only (i.e. finer granularity). For coarse grained notifications, registration involves providing the SQL text for the query and other information such as the user executing the query to the Database Change Notification Module 210. Since the process of registration involves a certain amount of overhead, repeated registrations in coarse grained notification can be eliminated. For example, in one or more embodiments, the Database Change Notification Module 210 may recognize that the SQL text has already been registered by a given Client 200 for a user. In the case of fine grained notification, the query has to be registered every time because notifications are desired only when the result set is invalidated and not just when an underlying table changes.

Those skilled in the art will recognize that the granularity specified at registration could be at variety of levels. Examples of available granularity options are: database level (i.e. detect all changes to the database), schema level (i.e. detect changes to the schema for the user), object level (i.e. detect changes to tables), projection level (i.e. detect changes to columns), selection level (i.e. detect changes to rows), and result set level (i.e. detect changes to a query result set). Depending on the granularity specification for invalidation of the client-side query cache contents at the Database Change Notification Module 210, the query Ids in some embodiments can be shared across SQL-text, across bind values and across client caches. In one or more embodiment, the query Ids can be shared across client caches to efficiently utilize database resources.

The cleanup or garbage collection of the query Ids stored on the Database may be based on a reference count of the number of Client-side Caches 212 receiving change notification for the SQL queries for a query Id. For example, if the granularity specification for invalidation of the client-side query cache contents at the Database Change Notification Module 210 is at table (object) level, then the below queries may allow for sharing the same query Id:

Query-1: select column1 from table-A
Query-2: select * from table-A
Query-3: select column2, column5 from table-A.

The query Id may be used by the Database Change Notification Module 210 to associate changes in the Database with result sets during query registration.

Figure 9:
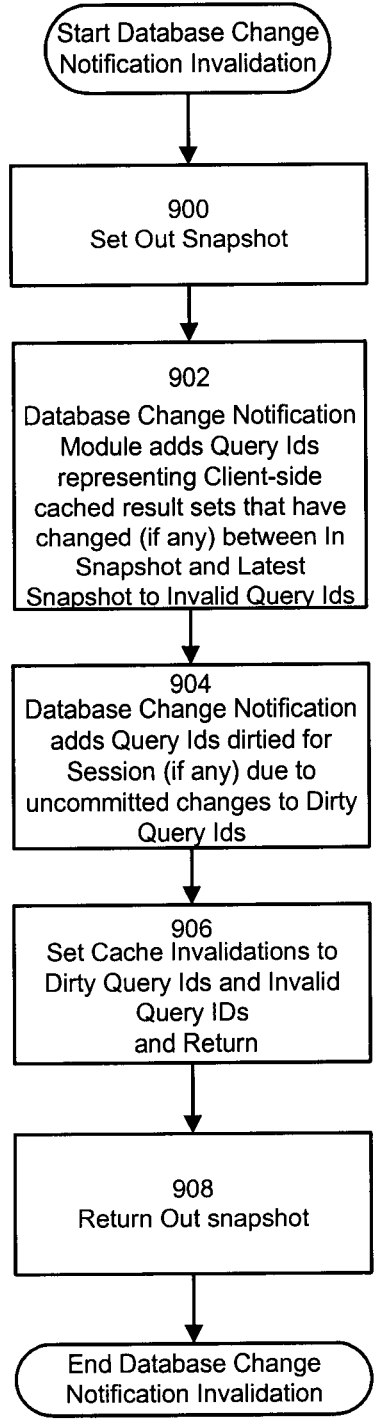
FIG. 9 is a flowchart of a process for an implementation of a consistent client-side cache.

Following registration of the query, FIG. 9 is a flowchart for the process of the Database Change Notification Module generation of the Cache Invalidations. The Database Change Notification Module 210 sets the Out Snapshot to a latest snapshot of the database taken after processing the last client request (900). The Database Change Notification Module 210 adds Query Ids for the Client 200 that have changed (if any) between the In Snapshot and the Out Snapshot, representing the latest interaction that the Client 200 had with the Database, to the set of Invalid Query Ids (902). In one or more embodiments, the invalid query ids are determined by comparing the snapshot of the database at the time the registered query is invalidated to the In Snapshot and Out Snapshot. If the snapshot at invalidation of the query is greater than In Snapshot and less then or equal to Out Snapshot, it is placed in the list of Invalid Query Ids. Registered queries whose query Ids are not in the list of invalid query ids are guaranteed to be consistent as of the Out Snapshot. The set of invalid query ids represent the query ids that have query results that are invalid in accordance with the granularity specified during registration with the Database Change Notification Module 210. Next, the Database Change Notification Module 210 adds dirtied Query Ids for the session (if any) due to the uncommitted changes to the Dirty Query Ids (904). The set of dirty query ids are the query ids for the cached queries affected by the uncommitted changes made by the current session and require the session to rely on query results returned by the server and not use the locally cached results. The Database Change Notification Module 210 completes the generation of Cache Invalidations by setting the Cache Invalidations to the sets of Dirty Query Ids and Invalid Query Ids (906). Next, the Out Snapshot is returned by the Database Change Notification Module (908). Continuing with FIG. 7, the Database Server 206 returns the Results, the Cache Invalidations (if any) and the Out Snapshot to the Database API 204 (710). In one or more embodiments, if the database request was for a query that is cacheworthy, then the query id and the query execution snapshot is returned.

In one or more embodiments of a consistent client-side cache, the Client 200 may receive early invalidations for database query results that have not been received by the Client 200 from the Database Server 206. For example, the Client 200 may not receive the results from a database request for a long running query or a query with results remaining in the network queue before sending a later request to the Database Server 206 and receiving a response from the Database Server 206 that would invalidate the earlier query whose results are not yet received. In such cases, the response to the later request may return from the Database Server 206 with results that indicate the cached results from the earlier request should be invalidated before the results from the earlier request are cached or even received by the client-side cache, hence an early invalidation occurs. When the results from the earlier request are received by the client-side cache, the client-side cache will cache the results made invalid by the later request without recognizing the invalidation of the results indicated in the response for the later request.

One approach for handling early invalidations is to retain the invalidations (e.g. a query id) and a snapshot of the database at a creation time of the invalidation for the query id. With the retention of the invalidations and the corresponding snapshots, the Cache Manger 214 may not cache the results of the earlier request in the above example because the snapshot associated with the results from the earlier request will be earlier in time than the snapshot associated with the invalid query id. To implement such an approach, an embodiment may return a query id, a result set and a snapshot of the database at execution of the query from the Database Server 206 to the Client 200 with the Database API 204. If the query involves a cacheworthy query, then the Cache Manager 214 of the Client 200 will ensure that the results are not cached if the snapshot for execution of the query associated with a query id is earlier in time than the snapshot for the invalidation of the same query id. In an approach for handling early invalidations, the consistent client-side cache may rely on multiple Database Server 206 connections such that the early and later query requests and responses in the above example may use more than one database connection. Garbage collection, memory management, may be implemented to discard (e.g. free, delete allocated space, etc.) the invalidation retained for the query id when the query id invalidation snapshot is older than all of the open sessions 202 in Client 200 last snapshot communicated, as described in detail in FIG. 6, to the Database Server 206.

In one or more embodiments, network problems may result in a delayed response from the Database Server 206 for the Client 200 that includes an invalidation for a query and cause performance issues with the client-side cache. For example, prior to the arrival of the delayed response to the Client 200, the Client 200 may make an intermediate database request and receive a response from the Database Server 206 for the intermediate request that includes a duplicate invalidation of the invalidation in the delayed response or a newer result set for a query designated as invalid in the delayed response. Upon receipt of the invalidation in the delayed response, the Cache Manager 214 either invalidate a newer result set or unnecessarily invalidate a query that has already been invalidated. One approach to avoid later duplicate invalidations is to retain the database invalidation snapshot associated with the invalid query id and compare it to the snapshot associated with the cached result set. With this approach, if the snapshot associated with the invalidation is older than the snapshot associated with the cached results, then the invalidation is discarded.

An embodiment will now be described for handling a Client 200 that has connections to multiple databases. If Client 200 that is supported by a Client-side Cache 212 is simultaneously connected to multiple Database Servers 206, it may need to differentiate between result sets from the different databases where the SQL text or user identification is similar. In one or more embodiments, a unique database identifier may be used to differentiate between the result sets from different databases. Optionally, a unique database identifier may include any of the following: database name, a database creation timestamp, a database startup time (i.e. every time the database is shutdown and re-started, there is a new timestamp) and/or any globally unique id. In another embodiment, a database may provide a database Id that is unique to that database. In one or more embodiments, a unique database identifier can be sent to the client during the connection (i.e. Session 202) establishment. The unique database identifier can be used to differentiate a result set from the result sets from other databases. In one or more embodiments, it may be beneficial to physically separate the Client-side Cache 212 for each Database Server 206. For example, all Sessions 202 having a common database identifier could use a different cache from the sessions having a different database identifier. Optionally, a Client-side Cache 212 could be shared and the unique database identifier may be used to identify a cached result set (e.g. part of compile key or runtime key).

An embodiment will now be described for multiple Clients 200 supported by Client-side Caches 212 that are connected to the same Database Server 206. The Database Server 206 may need to differentiate between these Client-side Caches 212 in the implementation of the Client-side Caches 212. In one or more embodiments, differentiating Client-side Caches 212 allows the Database Change Notification Module 210 to generate invalidations for each Client-side Caches 212. Embodiments may use the query id to identify both the query and the Client 200 that requested the query. Some embodiments may use a separate cache Id to distinguish between the Client-side Caches 212. In one or more embodiments, a cache Id can be a sequence number that is incremented for every client cache. The most recent cache Id may be stored persistently to ensure that the cache Id will remain after a restart of the database.

An embodiment will now be described for ensuring the completeness of cache invalidations in a clustered database approach. Those skilled in the art will appreciate that the approach may be used for a non-clustered database. A clustered configuration may have several nodes or instances which may share the same physical database. There may be a messaging capability between the instances enabling them to communicate information with each other. Within each instance, there may be a multi-process model in which transactions or queries can be executed concurrently in different server processes.

Database transactions executed against the database may be assigned a Commit Snapshot upon commit of a transaction. Each transaction may have its own database wide unique transaction id and the Commit Snapshot is typically recorded in persistent journals (e.g. a transaction table) atomically with the commit. It is possible with a transaction id to read the corresponding transaction table and retrieve the transaction Commit Snapshot (i.e. Commit Snapshot). In general, even if the Commit Snapshot cannot be accurately determined, it may be possible to determine an upper bound on the Commit Snapshot. Queries executed against the database may pick up a consistent Snapshot i.e. the query result set may be guaranteed to contain the effects of all transactions that have a Commit Snapshot less than or equal to the Query Snapshot and no others. Database instances may have their own notion of Lamport Snapshot, which may be a higher than or equal to the Commit Snapshots of all transactions known to the database instance. The Lamport Snapshot may reside in the shared memory of the database instance. Transactions upon commit are assigned a Commit Snapshot which is guaranteed to be higher than the Lamport Snapshot prior to commit. Events on the database server which are sequenced in time i.e. one after the other will see an increasing Lamport Snapshot.

The change notification infrastructure returns all invalidations generated by transactions with Commit Snapshot higher than the In Snapshot and Commit Snapshot less than or equal to the Out Snapshot. The Out Snapshot is assigned by the change notification module. These invalidations may be referred to as "inband invalidations" since they are returned synchronously upon every round trip from the client cache as opposed to being delivered asynchronously by the change notification module. The Out Snapshot may have the following properties: (1) higher than or equal to the Commit Snapshot of all changes done in the same round trip, (2) at least as high as the Lamport Snapshot on the instance so that in effect subsequent queries against the client cache can see the most current data, and (3) completeness of invalidations. Completeness of invalidations may be the set of invalidations returned from this module within the Snapshot range (i.e. between the In Snapshot and Out Snapshot) that are complete. If a transaction committed and caused a query id to change and the transaction Commit Snapshot was less than the Out Snapshot, then it must be included in the set. If a transaction commits in the future and caused a query result set to change and was not included in the returned set, it must commit at a Snapshot higher than the Out Snapshot. In one or more embodiments, requests for inband invalidations can be submitted in a process which is independent of the process which performed the transaction commit and caused a query result set to change. It may be on an instance which is different from the instance on which the transaction commit was performed.

Prior to commit, the Database Change Notification Module can determine a set of query ids that can be invalidated as a result of the changes done within the transaction. These invalidations (e.g. a list of query Ids) are tagged with the transaction id and recorded in the shared memory of the instance that generated them and synchronously broadcast to remote instances using the inter-instance messaging. At the end of the broadcast, each instance of the database has a copy of the (query id-transaction id) tuples. It may be necessary to publish these invalidations prior to commit. When a request for inband notifications arrives on an instance, the Out Snapshot is picked to be the Lamport Snapshot at the end of the call. This may ensure that it sees all changes done within the call and all recent transaction commits known to this instance. The instance on which the request is generated already knows the candidate set of invalidations (query Id, Transaction Id) tuples which is in its own shared memory. However, some of these may have Commit Snapshots higher than the Out Snapshot so it may not be included in the answer returned to the client-side cache. In order to determine which invalidations to include, the transaction tables may be consulted to obtain the Commit Snapshot of the transactions. If the Commit Snapshot is lower than or equal to the Out Snapshot, the corresponding query id is included or it is saved for later. Consulting the transaction table involves acquiring a short duration read lock (i.e. referred to as a pin) on the transaction table. A transaction which was active (perhaps on a different instance) at the time the request was being processed is guaranteed to commit with a Commit Snapshot higher than the Out Snapshot thereby guaranteeing the completeness of the invalidations because upon commit this transaction will acquire a short duration write lock to record its own Commit Snapshot. Because of the Lamport sequencing property described above, the Commit Snapshot of this transaction will be higher than the Out Snapshot thereby ensuring the completeness of invalidations returned in the previous result. The server may cleanup invalidations from its shared memory when the In Snapshot of the client cache has advanced beyond the Commit Snapshot of the transaction that generated a given invalidation. In this case, it is known that the client cache already has knowledge of this invalidation and hence it can be safely reclaimed.

An embodiment will now be described for handling normal client termination. When a Client-side Cache 212 process exits, the Database API 204 may be used to disconnect or terminate a Session 202 and halt the Database Change Notification Module 210 from generating a set of cache invalidations for registered queries that are pertinent to the Client 200 and/or the Session 202. In one or more embodiments, if multiple sessions are sharing the Client-side Cache 212, a reference count of the number of Sessions 202 relying on the Client-side Cache 212 can be maintained. If no sessions remain according to the reference count, then the Database Change Notification Module 210 may be prevented from generating a set of cache invalidations for registered queries that are pertinent to the Session 202 and garbage collection/cleanup may be performed. In one or more embodiments, Cache Ids can be part of a session state on the Database Server 206, and pertinent to the Client-side Cache 212 related persistent database tables. If the session state goes away as a result of client normal termination, a periodic database cleanup action may be used to find the cache Ids in the persistent tables. A cleanup/garbage collection action may be performed to free up the cache state including resources held in the Database Change Notification Module 210 used for generating a set of cache invalidations for registered queries that are pertinent to the Client 200 and/or the Session 202. In one or more embodiments, the Client-side Cache 212 may be a daemon process on the same or different machine, and this cache daemon may continue to be alive until the database is up, or periodically refresh the cached result sets or periodically re-start itself.

An embodiment will now be described for handling abnormal client termination. If a Client-side Cache 212 process dies before calling a cleanup/garbage collection action to free up resources including resources held in the Database Change Notification Module 210, it may impact the Database Server 206. In one or more embodiments, the Database Server 206 may perform periodic actions to check for the need to perform such cleanup action. The cleanup action may include freeing in-memory resources and persistent resources, for the abnormally terminated Client-side Cache 212.

In one embodiment, the cache Ids can be part of session state on the Database Server 206, and also in the client cache related persistent database tables. If the session state goes away as a result of client abnormal termination, the periodic database cleanup action may find the cache Ids in the persistent tables but not in the server session state. A cleanup/garbage collection action may be performed to free up the cache state at the server including resources held in the Database Change Notification Module 210.

An embodiment will now be described for handling duplicate result sets. During query execution for the Client 200, a duplicate result set may exist in the Client-side Cache 212 that is not invalidated. The caching for this result may be complete or incomplete. If caching is incomplete, the Cache Manager 214 in on or more embodiments may force this query execution to not create another cached result set on Client 200, while getting result set from Database Server 206. If caching is complete, it is not necessary for Cache Manager 214 to create another result set in the Client-side Cache 212. In one or more embodiments, an algorithm for retrieval of query execution results does not include invalid result sets in client cache and may ensure subsequent query executions will get result set from Database Server 206 to create a new result set at the Client 200.

An embodiment is now described for handling changing environment settings At any point, the Client 200 may change environment or session settings that may affect the result sets cached on Client 200. Database Server 206 calls made by same or different Clients 200 may also change environment settings that may affect result sets cached on various Client-side Cache 212. In one or more embodiments, the Client-side Cache 212 detects such changes in environment settings on its next Database Request (204) to the Database Server 206. The Database Server 206 request in one or more embodiments may return a new environment state, as piggyback. By always including the environment settings as part of runtime key computation, the Client-side Cache 212 may ensure that the query executions with different environment or session settings do not share result sets. In one or more embodiments, alteration of any environment or session state may affect query result sets that cant invalidate all result sets in the Client-side Cache 212. Examples of environment or session setting include language setting, time zone settings, and result-set output format.

SYSTEM ARCHITECTURE

Figure 10:
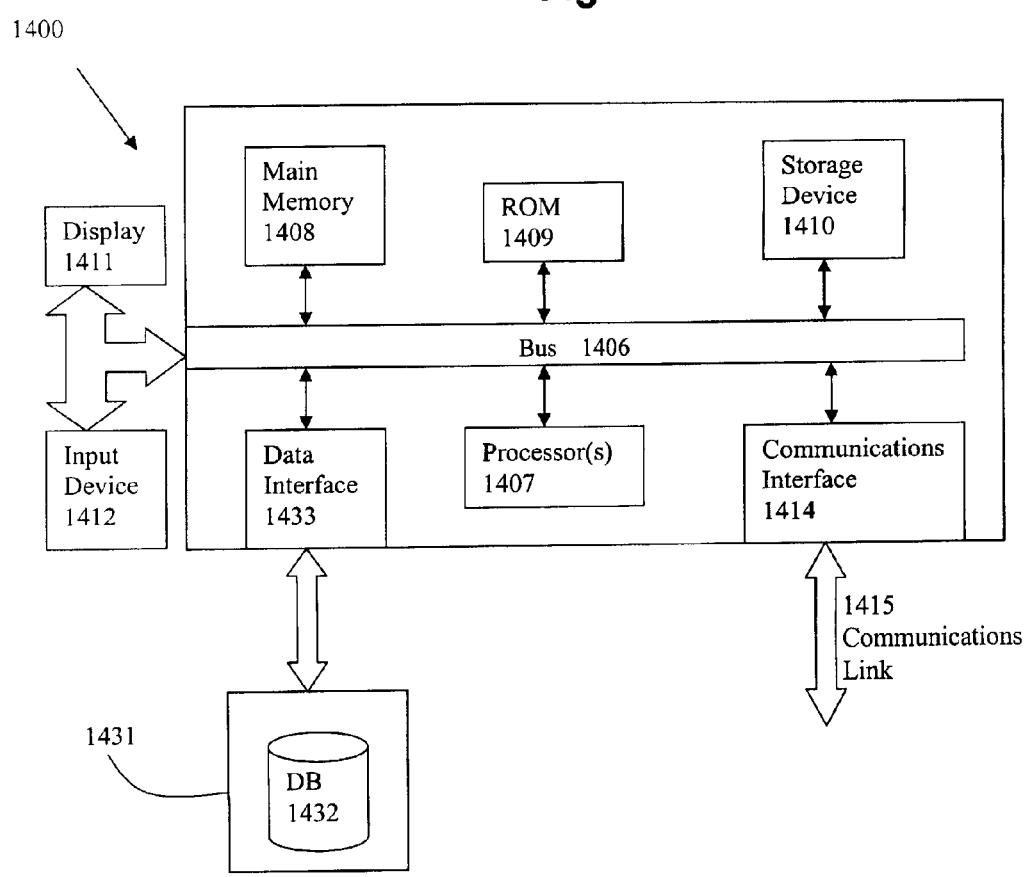
FIG. 10 is an architecture for support of an implementation of a consistent client-side cache.

The execution of the sequences of instructions required to practice the embodiments may be performed by a computer system 1400 as shown in FIG. 10. In an embodiment, execution of the sequences of instructions is performed by a single computer system 1400. According to other embodiments, two or more computer systems 1400 coupled by a communication link 1415 may perform the sequence of instructions in coordination with one another. Although a description of only one computer system 1400 will be presented below, however, it should be understood that any number of computer systems 1400 may be employed to practice the embodiments.

A computer system 1400 according to an embodiment will now be described with reference to FIG. 10, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem, or the communication link 1415 may be the Internet, in which case the communication interface 1414 may be a dial-up, cable or wireless modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Logic refers to software, hardware or any combination of software and hardware.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

What is claimed is:

1. A computer implemented method for caching query results in a client-side cache, comprising:
   identifying data stored on a database at a database server, the data comprising a first table and a second table, wherein a change in the second table executes a trigger that automatically modifies at least a portion of the first table that corresponds to the change in the second table;
   maintaining the query results at the client-side cache for a query, wherein the query results correspond to the first table and the second table stored on the database at the database server;
   sending, by using a processor, a database server request to the database server from a client, wherein the database server request is directed to a change in the second table stored on the database, the change in the second table executing the trigger that automatically modifies at least the portion of the first table to correspond to the change in the second table;
   receiving query results from the database server from processing the database server request, in which the database server also sends information pertaining to whether the query results cached at the client-side cache are invalid, wherein determining whether the query results are invalid comprises: (a) accessing a set of query registrations, a query registration from among the set of query registrations comprising a query identification along with identification of one or more database objects corresponding to the query identification, wherein first snapshot data is associated with the one or more database objects corresponding to the query identification, (b) comparing the first snapshot data with second snapshot data, the second snapshot data associated with a latest version of the one or more objects registered for the query identification; and (c) sending a response back to the client to invalidate the query results if comparison of the first snapshot data with the second snapshot data indicates a change to any of the one or more objects corresponding to the query identification that is specified to cause an invalidation of the query results for the query identification;
   wherein the query results were registered based upon a determination that the query should be cached by: (a) analyzing the query based at least on one or more of a size of a result of the query, whether a result of the query relies on data from read only or mostly read tables, a frequency expectation for a repeat of the query, a frequency expectation for a change in the query results, a constraint specified by the client, or an amount of computing expenses required to compute the query results; and (b) registering the query result at the server if it is determined that the query should be cached; and
   storing the information in a non-transitory computer-usable medium or displaying the information on a display device.

2. The method of claim 1, further comprising:
   sending from the client a first reference information with the database server request indicating a state of the database after a previous database server request by the client;
   receiving at the client a second reference information with the results indicating a current state of the database; and
   updating the first reference information with the second reference information.

3. The method of claim 1, further comprising:
   invalidating some or all of the one or more cached results that have been indicated as invalid for a client session, wherein the some or all of the one or more cached results includes cached results for the client session that relate to uncommitted database changes made by the client with the client session.

4. The method of claim 2 further comprising:
   receiving any number of cached result identifiers, wherein the any number of cached result identifiers relate to transactions that occurred between the first reference information and the second reference information; and
   invalidating any number of invalid cached results associated with the any number of cached result identifiers.

5. The method of claim 1, further comprising:
   determining at the client whether the query results at the client-side cache are invalid, wherein a cache manager accesses the client-side cache.

6. The method of claim 4, wherein the any number of cached result identifiers are query identifications.

7. The method of claim 1, wherein invalid cached results further comprise invalid results due to a change in environment settings.

8. The method of claim 1, wherein invalid cached results further comprise invalid cached result identifiers for database changes made by transactions other than those issued by the client.

9. The method of claim 1, wherein invalid cached results further comprise at least one cached result identifier associated with a snapshot of the database at creation time of at least one invalid cached result identifier.

10. The method of claim 1, wherein the snapshot data comprises at least data corresponding to a record of a state of the database for a committed transaction.

11. The method of claim 1, wherein invalid cached results are retained by the client along with a snapshot of the database at a creation time of an invalid cached result, wherein the invalid cached results are result sets associated with invalid cached result identifiers.

12. The method of claim 1, further comprising a maximum cache lag, wherein the cache is not accessed if the maximum cache lag is exceeded.

13. The method of claim 1, further comprising:
   determining if a query result needs to be cached, wherein the query result is designated to be cached at the client using one or more of the following: a data description language command, a query command or a database application programming interface; and
   caching the query result based at least in part upon an act of determining.

14. The method of claim 1, wherein the database server determines whether the query results at the client-side cache are invalid.

15. The method of claim 1, further comprising:
   responsive to determining the one or more query results are not cacheworthy, updating the client-side cache with information describing a set of invalid query results cached at the client-side cache;

identifying one or more invalid query results cached at the client-side cache based at least in part on one or more query identifications associated with a change in data stored on the database;

performing garbage collection after abnormal termination of the client;

wherein the information pertaining to whether the query results cached at the client-side cache are invalid is based at least in part on information describing transactions received from a database broadcast to additional database instances within a database cluster;

wherein the client is connected to a plurality of databases, where at least some of the databases are identified based on one or more of a database name, a database creation timestamp, a database startup time, and a globally unique identifier; and wherein the client is included in a plurality of clients connected to the database server.

16. A computer program product comprising a non-transitory computer usable medium having executable code to execute, by using a processor, a process for implementing a client cache in a computing system, the process comprising:

identifying data stored on a database at a database server, the data comprising a first table and a second table, wherein a change in the second table executes a trigger that automatically modifies at least a portion of the first table that corresponds to the change in the second table;

maintaining query results at a client-side cache for a query, wherein the query results correspond to the first table and the second table stored on the database at the database server;

sending, by using a processor, a database server request to the database server from a client, wherein the database server request is directed to a change in the second table stored on the database the change in the second table executing the trigger that automatically modifies at least the portion of the first table to correspond to the change in the second table;

receiving the query results from the database server from processing the database server request, in which the database server also sends information pertaining to whether the query results cached at the client-side cache are invalid, wherein determining whether the query results are invalid comprises: (a) accessing a set of query registrations, a query registration from among the set of query registrations comprising a query identification along with identification of one or more database objects corresponding to the query identification, wherein first snapshot data is associated with the one or more database objects corresponding to the query identification, (b) comparing the first snapshot data with second snapshot data, the second snapshot data associated with a latest version of the one or more objects registered for the query identification; and (c) sending a response back to the client to invalidate the query results if comparison of the first snapshot data with the second snapshot data indicates a change to any of the one or more objects corresponding to the query identification that is specified to cause an invalidation of the query results for the query identification;

wherein the query results were registered based upon a determination that the query should be cached by: (a) analyzing the query based at least on one or more of a size of a result of the query, whether a result of the query relies on data from read only or mostly read tables, a frequency expectation for a repeat of the query, a frequency expectation for a change in the query results, a constraint specified by the client, or an amount of computing expenses required to compute the query results; and (b) registering the query result at the server if it is determined that the query should be cached; and storing the information in a non-transitory computer-usable medium or displaying the information on a display device.

17. The product of claim 16, wherein the process executed by the executable code further comprises:

sending from the client a first reference information with the database server request, wherein the first reference information indicates a state of the database after a previous database server request by the client;

receiving at the client a second reference information with the results indicating a current state of the database; and updating a first snapshot information with the second reference information.

18. The product of claim 16, wherein the process executed by the executable code further comprises:

invalidating some or all of the one or more invalid cached results for a client session, wherein the some or all of the one or more invalid cached results includes cached results for the client session that relate to uncommitted database changes made by the client with the client session.

19. The product of claim 16, wherein the database server determines whether the query result at the client-side cache is invalid.

20. The product of claim 16, wherein the process executed by the executable code further comprises: determining at the client whether the query result at the client-side cache is invalid.

21. A computer system for caching query results in a client-side cache comprising:

a processor programmed for:

identifying data stored on a database at a database server, the data comprising a first table and a second table, wherein a change in the second table executes a trigger that automatically modifies at least a portion of the first table that corresponds to the change in the second table;

maintaining the query results at the client-side cache for a query, wherein the query results correspond to the first table and the second table stored on the database at the database server;

sending, by using a processor, a database server request to the database server from a client, wherein the database server request is directed to a change in the second table stored on the database the change in the second table executing the trigger that automatically modifies at least the portion of the first table to correspond to the change in the second table;

receiving the query results from the database server from processing the database server request, in which the database server also sends information pertaining to whether the query results cached at the client-side cache are invalid, wherein determining whether the query results are invalid comprises: (a) accessing a set of query registrations, a query registration from among the set of query registrations comprising a query identification along with identification of one or more database objects corresponding to the query identification, wherein first snapshot data is associated with the one or more database objects corresponding to the query identification, (b) comparing the first snapshot data with second snapshot data, the second snapshot data associated with a latest version of the one or more objects registered for the query identification; and (c) sending a response back to the client to invalidate the query results if comparison of the first snapshot data with the second snapshot data indicates a change to any of the one or more objects corresponding to the query identification that is specified to cause an invalidation of the query results for the query identification;

wherein the query results were registered based upon a determination that the query should be cached by: (a) analyzing the query based at least on one or more of a size of a result of the query, whether a result of the query relies on data from read only or mostly read tables, a frequency expectation for a repeat of the query, a frequency expectation for a change in the query results, a constraint specified by the client, or an amount of computing expenses required to compute the query results; and (b) registering the query result at the server if it is determined that the query should be cached; and storing the information in a non-transitory computer-usable medium for storing the information or displaying the information on a display device.

22. The system of claim 21, wherein the processor is further programmed for:

sending from the client a first reference information with the database server request, wherein the first reference information indicates a state of the database after a previous database server request by the client;

receiving at the client a second reference information with the results indicating a current state of the database; and updating a first snapshot information with the second reference information.

23. The system of claim 21, wherein the processor is further programmed for:

invalidating some or all of the one or more invalid cached results for a client session, wherein the some or all of the one or more invalid cached results includes cached results for the client session that relate to uncommitted database changes made by the client with the client session.

24. The system of claim 21, wherein the database server determines whether the query results at the client-side cache are invalid.

25. The system of claim 21, wherein the processor is further programmed for:

determining at the client whether the query results at the client-side cache are invalid, wherein a cache manager accesses the client-side cache.

26. A method for caching query results of a query in a client-side cache, comprising:

identifying data stored on a database at a database server, the data comprising a first table and a second table, wherein a change in the second table executes a trigger that automatically modifies at least a portion of the first table that corresponds to the change in the second table;

maintaining the query results at the client-side cache for a query, wherein the query results correspond to the first table and the second table stored on the database at the database server;

receiving, at the database server, a database server request from a client, wherein the database server request is directed to a change in the second table stored on the database, the change in the second table executing the trigger that automatically modifies at least the portion of the first table to correspond to the change in the second table;

processing, by using a processor, the database server request;

sending, from the database server, in response to the database server request, query results from the processing the database server request, and information pertaining to whether the query results cached at the client-side cache are invalid, wherein determining whether the query results are invalid comprises: (a) accessing a set of query registrations, a query registration from among the set of query registrations comprising a query identification along with identification of one or more database objects corresponding to the query identification, wherein first snapshot data is associated with the one or more database objects corresponding to the query identification, (b) comparing the first snapshot data with second snapshot data, the second snapshot data associated with a latest version of the one or more objects registered for the query identification; and (c) sending a response back to the client to invalidate the query results if comparison of the first snapshot data with the second snapshot data indicates a change to any of the one or more objects corresponding to the query identification that is specified to cause an invalidation of the query results for the query identification;

wherein the query results were registered based upon a determination that the query should be cached by: (a) analyzing the query based at least on one or more of a size of a result of the query, whether a result of the query relies on data from read only or mostly read tables, a frequency expectation for a repeat of the query, a frequency expectation for a change in the query results, a constraint specified by the client, or an amount of computing expenses required to compute the query results; and (b) registering the query result at the server if it is determined that the query should be cached; and storing the results in a non-transitory computer-usable medium or displaying the information on a display device.

27. The method of claim 26, further comprising:

determining at the database server whether the query results at the client-side cache are invalid.

28. The method of claim 26, further comprising:

providing information to allow the client to determine whether the query results at the client-side cache are invalid.

29. A system for caching query results in a client-side cache, comprising:

a processor programmed for:

identifying data stored on a database at a database server, the data comprising a first table and a second table, wherein a change in the second table executes a trigger that automatically modifies at least a portion of the first table that corresponds to the change in the second table;

maintaining the query results at the client-side cache for a query, wherein the query results correspond to the first table and the second table stored on the database at the database server;

receiving, at the database server, a database server request from a client, wherein the database server request is directed to a change in the second table stored on the database, the change in the second table executing the trigger that automatically modifies at least the portion of the first table to correspond to the change in the second table;

processing, by using a processor, the database server request;

sending, from the database server, in response to the database server request, query results from the processing the database server request, and information pertaining to whether the query results cached at the client-side cache are invalid, wherein determining whether the query results are invalid comprises: (a) accessing a set of query registrations, a query registration from among the set of query registrations comprising a query identification along with identification of one or more database objects corresponding to the query identification, wherein first snapshot data is associated with the one or more database objects corresponding to the query identification, (b) comparing the first snapshot data with second snapshot data, the second snapshot data associated with a latest version of the one or more objects registered for the query identification; and (c) sending a response back to the client to invalidate the query results if comparison of the first snapshot data with the second snapshot data indicates a change to any of the one or more objects corresponding to the query identification that is specified to cause an invalidation of the query results for the query identification;

wherein the query results were registered based upon a determination that the query should be cached by: (a) analyzing the query based at least on one or more of a size of a result of the query, whether a result of the query relies on data from read only or mostly read tables, a frequency expectation for a repeat of the query, a frequency expectation for a change in the query results, a constraint specified by the client, or an amount of computing expenses required to compute the query results; and (b) registering the query result at the server if it is determined that the query should be cached; and storing the information in a non-transitory computer-usable medium for storing the results or displaying the information on a display device.

30. The system of claim 29, wherein the processor is further programmed for:
determining at the database server whether the query results at the client-side cache are invalid.

31. The system of claim 29, wherein the processor is further programmed for:
providing information to allow the client to determine whether the query results at the client-side cache are invalid.

32. A computer program product comprising a non-transitory computer usable medium having executable code to execute, by using a processor, a process for caching query results in a client-side cache in a computing system, the process comprising:
identifying data stored on a database at a database server, the data comprising a first table and a second table, wherein a change in the second table executes a trigger that automatically modifies at least a portion of the first table that corresponds to the change in the second table;

maintaining the query results at the client-side cache for a query, wherein the query results correspond to the first table and the second table stored on the database at the database server;

receiving, at the database server, a database server request from a client, wherein the database server request is directed to a change in the second table stored on the database, the change in the second table executing the trigger that automatically modifies at least the portion of the first table to correspond to the change in the second table;

processing, by using a processor, the database server request;

sending, from the database server, in response to the database server request, query results from the processing the database server request, and information pertaining to whether the query results cached at the client-side cache are invalid, wherein determining whether the query results are invalid comprises: (a) accessing a set of query registrations, a query registration from among the set of query registrations comprising a query identification along with identification of one or more database objects corresponding to the query identification, wherein first snapshot data is associated with the one or more database objects corresponding to the query identification, (b) comparing the first snapshot data with second snapshot data, the second snapshot data associated with a latest version of the one or more objects registered for the query identification; and (c) sending a response back to the client to invalidate the query results if comparison of the first snapshot data with the second snapshot data indicates a change to any of the one or more objects corresponding to the query identification that is specified to cause an invalidation of the query results for the query identification;

wherein the query results were registered based upon a determination that the query should be cached by: (a) analyzing the query based at least on one or more of a size of a result of the query, whether a result of the query relies on data from read only or mostly read tables, a frequency expectation for a repeat of the query, a frequency expectation for a change in the query results, a constraint specified by the client, or an amount of computing expenses required to compute the query results; and (b) registering the query result at the server if it is determined that the query should be cached; and storing the results in a non-transitory computer-usable medium or displaying the information on a display device.

33. The product of claim 32, wherein the process further comprises:
determining at the database server whether the query results at the client-side cache are invalid.

34. The product of claim 32, wherein the process further comprises:
providing information to allow the client to determine whether the query results at the client-side cache are invalid.

* * * * *

UNITED STATES PATENT AND TRADEMARK OFFICE
CERTIFICATE OF CORRECTION

PATENT NO. : 9,697,253 B2
APPLICATION NO. : 11/875782
DATED : July 4, 2017
INVENTOR(S) : Chidambaran et al.

It is certified that error appears in the above-identified patent and that said Letters Patent is hereby corrected as shown below:

In the Specification

In Column 10, Line 27, delete "then" and insert -- than --, therefor.

In Column 14, Line 58, delete "on" and insert -- one --, therefor.

In Column 15, Line 2, delete "settings" and insert -- settings. --, therefor.

In Column 15, Line 17, delete "cant" and insert -- can't --, therefor.

Signed and Sealed this
Thirteenth Day of February, 2018

Andrei Iancu
*Director of the United States Patent and Trademark Office*